US012106695B2

(12) United States Patent
Yim et al.

(10) Patent No.: US 12,106,695 B2
(45) Date of Patent: Oct. 1, 2024

(54) DISPLAY DEVICE AND DRIVING METHOD THEREOF

(71) Applicant: SAMSUNG DISPLAY CO., LTD., Yongin-si (KR)

(72) Inventors: Dale Yim, Yongin-si (KR); In Bok Song, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 18/053,818

(22) Filed: Nov. 9, 2022

(65) Prior Publication Data

US 2023/0335032 A1 Oct. 19, 2023

(30) Foreign Application Priority Data

Apr. 14, 2022 (KR) ........................ 10-2022-0046515

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0819* (2013.01); *G09G 2300/0842* (2013.01); *G09G 2310/027* (2013.01); *G09G 2310/0297* (2013.01); *G09G 2310/08* (2013.01); *G09G 2354/00* (2013.01)

(58) Field of Classification Search
CPC ............... G09G 3/2007; G09G 3/3233; G09G 2300/0819; G09G 2300/0842; G09G 2310/027; G09G 2310/0297; G09G 2310/08; G09G 2354/00
See application file for complete search history.

(56) References Cited

U.S. PATENT DOCUMENTS 11,195,455 B2 12/2021 Yim et al.
2005/0185098 A1* 8/2005 Pencil ...................... G09G 3/20 348/615
2010/0225635 A1* 9/2010 Murahashi ............. G09G 3/006 345/204
2020/0234626 A1* 7/2020 Yim ..................... G09G 3/2011
2021/0104205 A1* 4/2021 Chen ........................ G09G 5/12
2023/0215317 A1* 7/2023 Kim ....................... G09G 3/006 345/214

FOREIGN PATENT DOCUMENTS

KR 10-2019-0060909 6/2019

* cited by examiner

*Primary Examiner* — Priyank J Shah
(74) *Attorney, Agent, or Firm* — F. Chau & Associates, LLC

(57) ABSTRACT

A display device of the present disclosure includes a pixel unit having a plurality of pixel rows; a color controller configured to convert input grayscales for each of the pixel rows into output grayscales based on user setting parameters; and a data driver configured to supply data voltages corresponding to the output grayscales to each of the pixel rows, and the color controller includes a plurality of grayscale converters configured to convert the input grayscales for a plurality of target pixels corresponding to a part of a pixel row into the output grayscales in parallel, wherein the plurality of target pixels are most adjacent to each other; and a path determiner configured to match the output grayscales with the plurality of target pixels.

12 Claims, 12 Drawing Sheets

| Case | condition | C1 | C2 | C3 |
|---|---|---|---|---|
| A1 | g_r>g_g>g_b | TLUT_R-TLUT_K | TLUT_C-TLUT_R | TLUT_W-TLUT_Y |
| A2 | g_r>g_b>g_g | TLUT_R-TLUT_K | TLUT_W-TLUT_M | TLUT_M-TLUT_R |
| A3 | g_b>g_r>g_g | TLUT_M-TLUT_B | TLUT_W-TLUT_M | TLUT_B-TLUT_K |
| A4 | g_g>g_r>g_b | TLUT_Y-TLUT_G | TLUT_G-TLUT_K | TLUT_W-TLUT_Y |
| A5 | g_g>g_b>g_r | TLUT_W-TLUT_C | TLUT_G-TLUT_K | TLUT_C-TLUT_G |
| A6 | g_b>g_g>g_r | TLUT_W-TLUT_C | TLUT_C-TLUT_B | TLUT_B-TLUT_K |

DISPLAY DEVICE AND DRIVING METHOD THEREOF

CROSS-REFERENCE TO RELATED APPLICATION

The present application claims priority under 35 U.S.C. § 119 to and the benefit of Korean Patent Application No. 10-2022-0046515, filed Apr. 14, 2022, the disclosure of which is hereby incorporated by reference for all purposes as if fully set forth herein.

FIELD

The present disclosure relates to a display device and a driving method thereof.

DISCUSSION

With the continuing development of information technology, the importance of display devices, which provide a connection medium between users and information, has been emphasized. In response to this, the use of display devices such as liquid crystal display devices, organic light-emitting display devices, and the like has been increasing.

A display device may include a display driver such as a driver integrated circuit (IC) that processes digital data for an image, and pixels that display an image by receiving data voltages corresponding to the digital data.

In such a display driver, some logic circuits may malfunction or fail under various conditions such as when the temperature is high or the usage time (number of uses) increases. If a logic circuit fails, digital data might not be processed normally, and an incorrect image might be displayed or an image might not be displayed at all.

SUMMARY

Embodiments of the present disclosure may provide a display device capable of displaying an optimized image for each situation by diagnosing a failure even if some logic circuits fail in a display driver, and a driving method thereof.

A display device according to an embodiment of the present disclosure may include: a pixel unit including a plurality of pixel rows; a color controller configured to convert input grayscales for each of the pixel rows into output grayscales based on user setting parameters; and a data driver configured to supply data voltages corresponding to the output grayscales to each of the pixel rows, wherein the color controller includes: a plurality of grayscale converters configured to convert the input grayscales for a plurality of target pixels corresponding to a part of a pixel row into the output grayscales in parallel, wherein the plurality of target pixels are most adjacent to each other; and a path determiner configured to match the output grayscales with the plurality of target pixels.

The plurality of grayscale converters may include: a first grayscale converter configured to convert a first input grayscale for a first target pixel into a first output grayscale; a second grayscale converter configured to convert a second input grayscale for a second target pixel into a second output grayscale; a third grayscale converter configured to convert a third input grayscale for a third target pixel into a third output grayscale; and a fourth grayscale converter configured to convert a fourth input grayscale for a fourth target pixel into a fourth output grayscale When all of the first grayscale converter, the second grayscale converter, the third grayscale converter, and the fourth grayscale converter are diagnosed as normal, the path determiner is configured to match the first output grayscale to the first target pixel, match the second output grayscale to the second target pixel, to match the third output grayscale to the third target pixel, and to match the fourth output grayscale to the fourth target pixel.

When two of the first grayscale converter, the second grayscale converter, the third grayscale converter, and the fourth grayscale converter are diagnosed as abnormal and the other two are diagnosed as normal, the path determiner is configured to match output grayscales of the two grayscale converters diagnosed as normal to the first target pixel and the third target pixel.

When two of the first grayscale converter, the second grayscale converter, the third grayscale converter, and the fourth grayscale converter are diagnosed as abnormal and the other two are diagnosed as normal, the path determiner is configured to provide black grayscales to the second target pixel and the fourth target pixel.

When one of the first grayscale converter, the second grayscale converter, the third grayscale converter, and the fourth grayscale converter is diagnosed as abnormal and the other three are diagnosed as normal, the path determiner is configured to match output grayscales of the three grayscale converters diagnosed as normal with original target pixels, and to provide a black grayscale to a target pixel not matched with the output grayscales.

When three of the first grayscale converter, the second grayscale converter, the third grayscale converter, and the fourth grayscale converter are diagnosed as abnormal and the other one is diagnosed as normal, the path determiner configured to match an output grayscale of the one grayscale converter diagnosed as normal with an original target pixel, and to provide black grayscales to target pixels not matched with the output grayscale.

The color controller may further include: first multiplexers configured to provide the input grayscales in a normal mode and to provide diagnostic input grayscales in a diagnostic mode; and second multiplexers configured to provide the user setting parameters in the normal mode and to provide diagnostic parameters in the diagnostic mode, wherein the grayscale converters are configured to convert the input grayscales into the output grayscales based on the user setting parameters in the normal mode, and to convert the diagnostic input grayscales into diagnostic output grayscales based on the diagnostic parameters in the diagnostic mode.

The path determiner may diagnose a grayscale converter having a diagnostic output grayscale as normal when the diagnostic output grayscale is equal to an expected value in the diagnostic mode, and to diagnose the grayscale converter having the diagnostic output grayscale as abnormal when the diagnostic output grayscale is not equal to the expected value in the diagnostic mode.

The user setting parameters may be values that can be changed by a user setting, the input grayscales may be values that can be changed according to an input image, and the diagnostic parameters, the diagnostic input grayscales, and the diagnostic output grayscales may be preset fixed values.

A driving method of a display device according to an embodiment of the present disclosure may include: a step of converting input grayscales for each pixel row into output grayscales based on user setting parameters; and a step of supplying data voltages corresponding to the output grayscales to each pixel row. The step of converting the input grayscales for each pixel row into the output grayscales may include: steps of converting the input grayscales for a plurality of target pixels corresponding to a part of a pixel row into the output grayscales in parallel, the plurality of target pixels being most adjacent to each other; and a step of matching the output grayscales with the plurality of target pixels.

The steps of converting the input grayscales into the output grayscales in parallel may include: a step of converting a first input grayscale for a first target pixel into a first output grayscale; a step of converting a second input grayscale for a second target pixel into a second output grayscale; a step of converting a third input grayscale for a third target pixel into a third output grayscale; and a step of converting a fourth input grayscale for a fourth target pixel into a fourth output grayscale.

The step of matching the output grayscales with the plurality of target pixels may include: a step of matching the first output grayscale to the first target pixel, matching the second output grayscale to the second target pixel, matching the third output grayscale to the third target pixel, and matching the fourth output grayscale to the fourth target pixel when it is diagnosed that all of the steps of converting the input grayscales into the output grayscales in parallel are normally performed.

The step of matching the output grayscales with the plurality of target pixels may further include: a step of matching output grayscales of two steps diagnosed as normally performed to the first target pixel and the third target pixel when two steps are diagnosed as abnormally performed and the other two steps are diagnosed as normally performed among the steps of converting the input grayscales into the output grayscales in parallel.

The step of matching the output grayscales with the plurality of target pixels may further include: a step of providing black grayscales to the second target pixel and the fourth target when two steps are diagnosed as abnormally performed and the other two steps are diagnosed as normally performed among the steps of converting the input grayscales into the output grayscales in parallel.

The step of matching the output grayscales with the plurality of target pixels may further include: a step of matching output grayscales of three steps diagnosed as normally performed with original target pixels and providing a black grayscale to a target pixel being not matched with the output grayscales when one step is diagnosed as abnormally performed and the other three steps are diagnosed as normally performed among the steps of converting the input grayscales into the output grayscales in parallel.

The step of matching the output grayscales with the plurality of target pixels may further include: a step of matching an output grayscale of one step diagnosed as normally performed with an original target pixel and providing black grayscales to target pixels being not matched with the output grayscale when three steps are diagnosed as abnormally performed and the other one step is diagnosed as normally performed among the steps of converting the input grayscales into the output grayscales in parallel.

The step of converting the input grayscales into the output grayscales in parallel may include: a step of converting the input grayscales into the output grayscales based on the user setting parameters in a normal mode, and converting diagnostic input grayscales into diagnostic output grayscales based on diagnostic parameters in a diagnostic mode.

The step of matching the output grayscales with the plurality of target pixels may include: a step of diagnosing that the step of converting the input grayscales into the output grayscales in parallel, in which a diagnostic output grayscale is provided, has been normally performed when the diagnostic output grayscale is equal to an expected value in the diagnostic mode, and diagnosing that the step of converting the input grayscales into the output grayscales in parallel, in which the diagnostic output grayscale is provided, has been abnormally performed when the diagnostic output grayscale is not equal to the expected value in the diagnostic mode.

The user setting parameters may be values that can be changed by a user setting, the input grayscales may be values that can be changed according to an input image, and the diagnostic parameters, the diagnostic input grayscales, and the diagnostic output grayscales may be preset fixed values.

BRIEF DESCRIPTION OF THE DRAWINGS

The accompanying drawings, which are included to provide a further understanding of the inventive concepts by way of example, and are incorporated in and constitute a part of this specification, illustrate embodiments of the inventive concepts, and, together with the description, serve to explain principles of the inventive concepts, in which.

DETAILED DESCRIPTION

Figure 1:
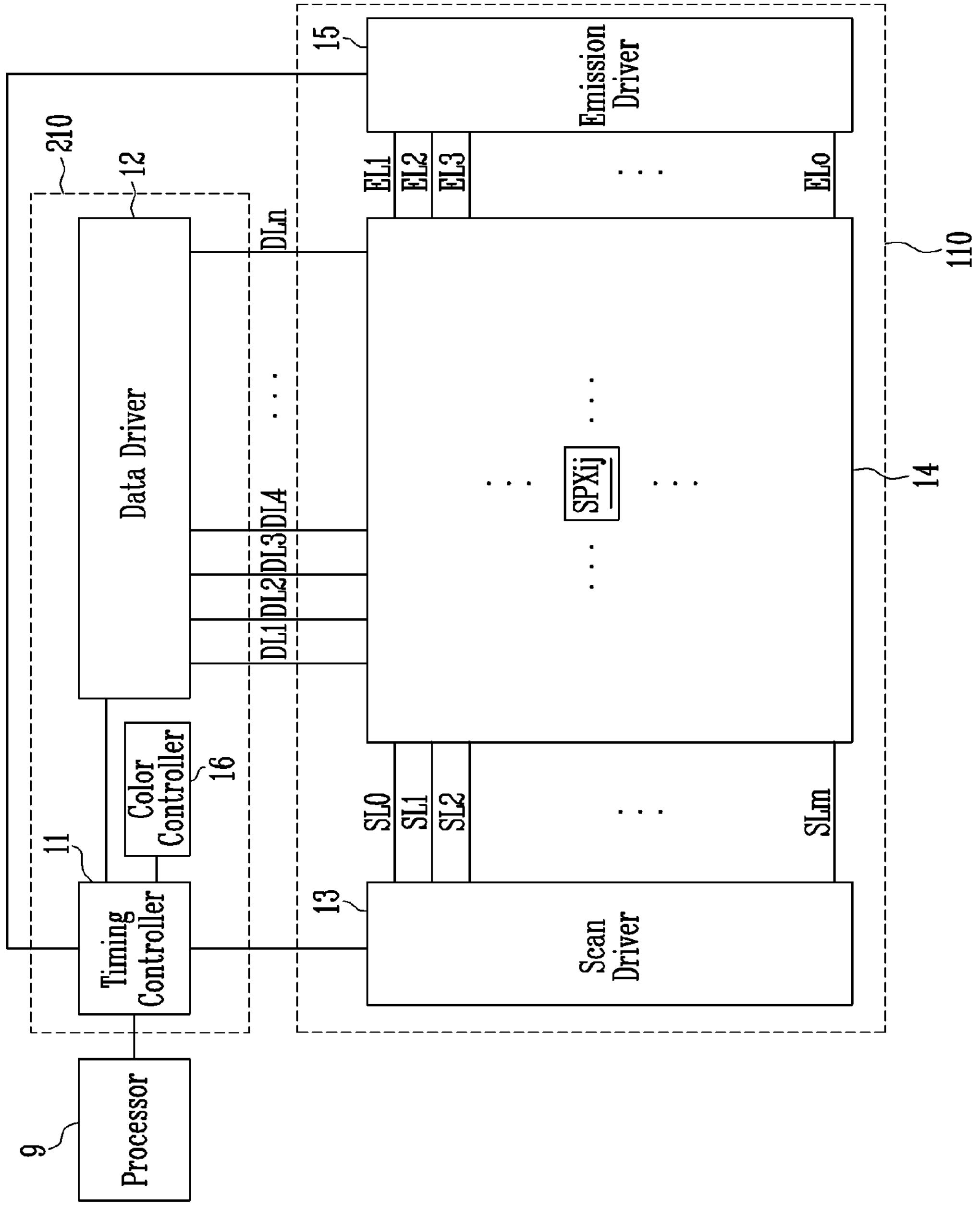
FIG. 1 is a block diagram for explaining a display device according to an embodiment of the present disclosure.

Hereinafter, various embodiments of the present disclosure may be described in detail by way of example with reference to the accompanying drawings so that those of ordinary skill in the pertinent art may effectively implement the present disclosure. The present disclosure may be embodied in various different forms and is not limited to the embodiments described herein.

In order to clearly describe the present disclosure, parts that are not related to the description may be omitted, and the same or similar components may be denoted by the same or similar reference numerals throughout the specification.

Therefore, the reference numerals introduced in a given drawing may also be used in other drawings.

In addition, the size and thickness of each component shown in the drawings may be shown arbitrarily for convenience of description, and thus the present disclosure is not necessarily limited to those shown in the drawings. In the drawings, thicknesses may be exaggerated to more clearly express the layers and regions, for example.

In addition, in the description, the expression "is the same" may mean "substantially the same". That is, it may be similar enough so that those of ordinary skill in the pertinent art may implement the same understandings. In other expressions, "substantially" may be omitted.

Figure 2:
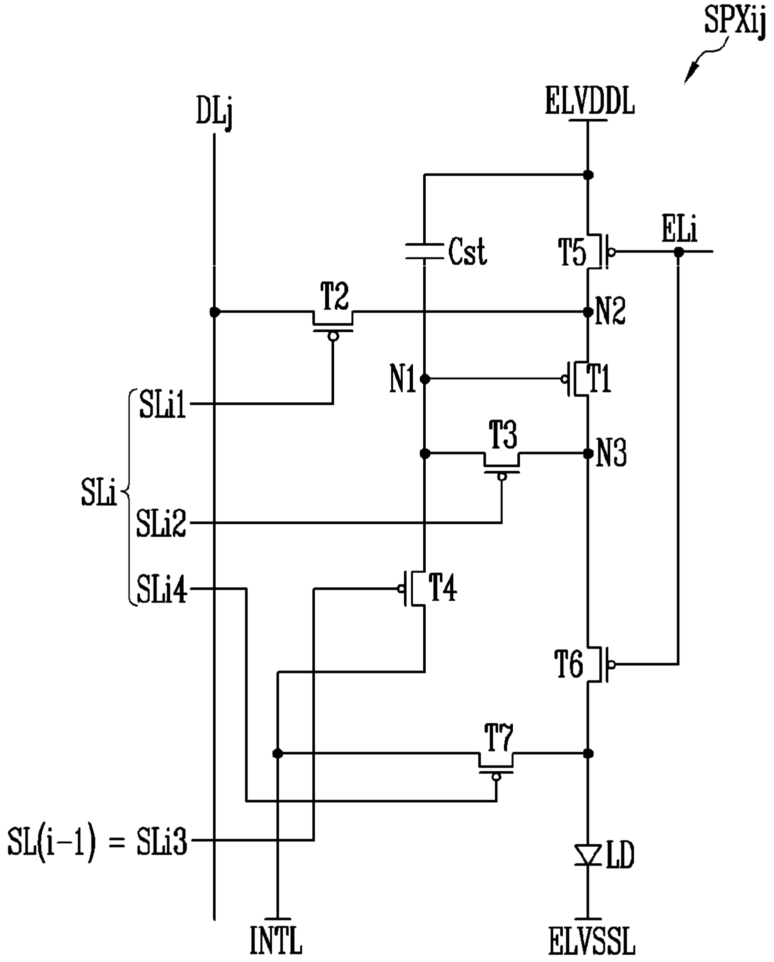
FIG. 2 is a circuit diagram for explaining a display device according to an embodiment of the present disclosure.
Figure 3:
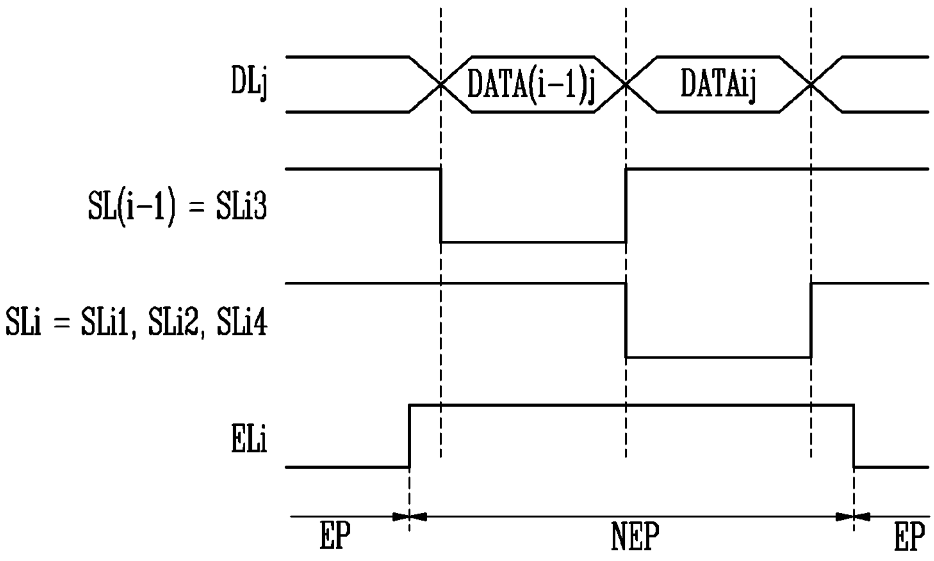
FIG. 3 is a signal timing diagram for explaining a display device according to an embodiment of the present disclosure.

FIGS. 1 to 3 are referenced for explaining a display device according to an embodiment of the present disclosure.

FIG. 1 is presented for explaining a display unit and a display driver according to an embodiment of the present disclosure.

Referring to FIG. 1, a display driver 210 may include a timing controller 11, a color controller 16, and a data driver 12. A display unit 110 may include a scan driver 13, a pixel unit 14, and an emission driver 15. However, alternate embodiments in which each functional unit is integrated into one IC, integrated into a plurality of ICs, or mounted on a display substrate may be configured in various ways to meet design specifications of a given display device.

The timing controller 11 may receive input grayscales and timing signals for each frame period from a processor 9. Here, the processor 9 may correspond to at least one of a graphics processing unit (GPU), a central processing unit (CPU), or an application processor (AP). The timing signals may include a vertical synchronization signal, a horizontal synchronization signal, a data enable signal, or the like.

Each cycle of the vertical synchronization signal may correspond to each frame period. Each cycle of the horizontal synchronization signal may correspond to each horizontal period. The grayscales may be supplied in units of horizontal lines in each horizontal period in response to an enable level pulse of the data enable signal. A horizontal line may mean pixels (for example, a pixel row) connected to the same scan line and emission line, for example.

The color controller 16 may convert input grayscales for each pixel row into output grayscales based on user setting parameters. For example, if the input grayscales constituting an image are set regardless of the characteristics of the display device, the color controller may be configured to adjust the color gamut according to the characteristics of each display device. A user of the display device may optimally adjust the color of the image on the display device by adjusting the user setting parameters. The user setting parameters may be described in greater detail further below with reference to FIG. 6.

The timing controller 11 may provide the output grayscales and a data control signal to the data driver 12. Also, the timing controller 11 may provide a scan control signal to the scan driver 13 and an emission control signal to the emission driver 15.

The data driver 12 may generate data signals (e.g., data voltages) to be provided to data lines DL1, DL2, DL3, DL4, . . . , and DLn using the output grayscales and the data control signal received from the timing controller 11, where n may be an integer greater than 0.

The scan driver 13 may generate scan signals to be provided to scan lines SL0, SL1, SL2, . . . , and SLm using the scan control signal (e.g., a clock signal, a scan start signal, or the like) received from the timing controller 11, where m may be an integer greater than zero. The scan driver 13 may sequentially supply the scan signals having a turn-on level pulse to the scan lines SL0 to SLm. The scan driver 13 may include scan stages configured in the form of a shift register. The scan driver 13 may generate the scan signals by sequentially transferring the scan start signal in the form of a turn-on level pulse to the next scan stage according to the control of the clock signal.

The emission driver 15 may generate emission signals to be provided to emission lines EL1, EL2, EL3, . . . , and ELo using the emission control signal (e.g., a clock signal, an emission stop signal, or the like) received from the timing controller 11, where o may be an integer greater than zero. The emission driver 15 may sequentially supply the emission signals having a turn-off level pulse to the emission lines EL1 to ELo. The emission driver 15 may include emission stages configured in the form of a shift register. The emission driver 15 may generate the emission signals by sequentially transferring the emission stop signal in the form of a turn-off level pulse to the next emission stage according to the control of the clock signal.

The pixel unit 14 may include a plurality of pixel rows. As described above, the pixel row may mean pixels connected to the same scan line and emission line. Each pixel may include two or more sub-pixels. Each sub-pixel SPXij may be connected to a corresponding data line, scan line, and emission line. The sub-pixels may include sub-pixels emitting light of a first color, sub-pixels emitting light of a second color, and sub-pixels emitting light of a third color. The first color, the second color, and the third color may be different colors. For example, the first color may be one of red, green, and blue, the second color may be one other than the first color among red, green, and blue, and the third color may be one other than the first color and the second color among red, green, and blue. In addition, magenta, cyan, and yellow may be used instead of red, green, and blue as the first to third colors. In alternate embodiments, a different plurality of sub-pixel colors may be used (e.g., four), or at least one sub-pixel of variable color may be used.

FIG. 2 is presented for explaining a sub-pixel according to an embodiment of the present disclosure.

Referring to FIG. 2, the sub-pixel SPXij may include transistors T1, T2, T3, T4, T5, T6, and T7, a storage capacitor Cst, and a light emitting element LD.

Hereinafter, a circuit composed of P-type transistors may be described as an example. However, a person skilled in the art may be able to design a circuit composed of N-type transistors by changing the polarity of a voltage applied to a gate terminal. Similarly, a person skilled in the art may be able to design a circuit composed of a combination of P-type transistors and N-type transistors. A P-type transistor may generally refer to a transistor in which the amount of current increases when a voltage difference between a gate electrode and a source electrode increases in a negative direction. An N-type transistor may generally refer to a transistor in which the amount of current increases when a voltage difference between a gate electrode and a source electrode increases in a positive direction. The transistors may be configured in various forms, such as a thin film transistor (TFT), a field effect transistor (FET), and a bipolar junction transistor (BJT).

A first transistor T1 may have a gate electrode connected to a first node N1, a first electrode connected to a second node N2, and a second electrode connected to a third node N3. The first transistor T1 may be referred to as a driving transistor.

A second transistor T2 may have a gate electrode connected to a scan line SLi1, a first electrode connected to a data line DLj, and a second electrode connected to the second node N2. The second transistor T2 may be referred to as a scan transistor.

A third transistor T3 may have a gate electrode connected to a scan line SLi2, a first electrode connected to the first node N1, and a second electrode connected to the third node N3. The third transistor T3 may be referred to as a diode-connected transistor.

A fourth transistor T4 may have a gate electrode connected to a scan line SLi3, a first electrode connected to the first node N1, and a second electrode connected to an initialization line INTL. The fourth transistor T4 may be referred to as a gate initialization transistor.

A fifth transistor T5 may have a gate electrode connected to an i-th emission line ELi, a first electrode connected to a first power source line ELVDDL, and a second electrode connected to the second node N2. The fifth transistor T5 may be referred to as an emission transistor. In another embodiment, the gate electrode of the fifth transistor T5 may be connected to an emission line different from an emission line connected to a gate electrode of a sixth transistor T6.

The sixth transistor T6 may have the gate electrode connected to the i-th emission line ELi, a first electrode connected to the third node N3, and a second electrode connected to an anode of the light emitting element LD. The sixth transistor T6 may be referred to as an emission transistor. In another embodiment, the gate electrode of the sixth transistor T6 may be connected to an emission line different from the emission line connected to the gate electrode of the fifth transistor T5.

A seventh transistor T7 may have a gate electrode connected to a scan line SLi4, a first electrode connected to the initialization line INTL, and a second electrode connected to the anode of the light emitting element LD. The seventh transistor T7 may be referred to as an anode initialization transistor.

A first electrode of the storage capacitor Cst may be connected to the first power source line ELVDDL, and a second electrode of the storage capacitor Cst may be connected to the first node N1.

The light emitting element LD may have the anode connected to the second electrode of the sixth transistor T6 and a cathode connected to a second power source line ELVSSL. The light emitting element LD may be a light emitting diode. The light emitting element LD may be composed of an organic light emitting diode, an inorganic light emitting diode, a quantum dot/well light emitting diode, or the like. The light emitting element LD may emit light of any one of a first color, a second color, and a third color. In addition, although the present embodiment describes a case in which one light emitting element LD is provided in each sub-pixel SPXij, a plurality of light emitting elements may be provided in each sub-pixel SPXij in another embodiment. In this case, the plurality of light emitting elements may be connected to each other in series, in parallel, in series and parallel, or the like.

A first power source voltage may be applied to the first power source line ELVDDL, a second power source voltage may be applied to the second power source line ELVSSL, and an initialization voltage may be applied to the initialization line INTL. For example, the first power source voltage may be greater than the second power source voltage. For example, the initialization voltage may be equal to or greater than the second power source voltage. For example, the initialization voltage may correspond to a data voltage having the smallest magnitude among the data voltages that can be provided. In another example, the magnitude of the initialization voltage may be smaller than magnitudes of the data voltages that can be provided.

FIG. 3 is presented for explaining an example of a method of driving the sub-pixel SPXij of FIG. 2.

Hereinafter, for convenience of description, it is assumed that the scan lines SLi1, SLi2, and SLi4 are an i-th scan line SLi, and the scan line SLi3 is an (i−1)th scan line SL(i−1). However, the connection relationship of the scan lines SLi1, SLi2, SLi3, and SLi4 may vary according to embodiments. For example, the scan line SLi4 may be the (i−1)th scan line or an (i+1)th scan line.

First, an emission signal of a turn-off level (logic high level) may be applied to the i-th emission line ELi, and a data voltage DATA(i−1)j for an (i−1)th sub-pixel may be applied to the data line DLj, and a scan signal of a turn-on level (logic low level) may be applied to the scan line SLi3. High/low at the logic level may vary depending on whether the transistor is P-type or N-type.

In this case, since a scan signal of a turn-off level is applied to the scan lines SLi1 and SLi2, the second transistor T2 may be in a turned-off state, and the data voltage DATA(i−1)j for the (i−1)th sub-pixel may be prevented from being applied to the sub-pixel SPXij.

At this time, since the fourth transistor T4 may be in a turned-on state, the first node N1 may be connected to the initialization line INTL to initialize the voltage of the first node N1. Since the emission signal of the turn-off level is applied to the emission line ELi, the transistors T5 and T6 may be in a turned-off state, and an effect in which light is unnecessarily emitted from the light emitting element LD according to the process of applying the initialization voltage can be prevented.

Next, a data voltage DATAij for an i-th sub-pixel SPXij may be applied to the data line DLj, and a scan signal of a turn-on level may be applied to the scan lines SLi1 and SLi2. Accordingly, the transistors T2, T1, and T3 may be in a turned-on state, and the data line DLj and the first node N1 may be electrically connected to each other. Accordingly, a compensation voltage obtained by subtracting a threshold voltage of the first transistor T1 from the data voltage DATAij may be applied to the second electrode of the storage capacitor Cst (that is, the first node N1), and the storage capacitor Cst may maintain a voltage corresponding to a difference between the first power source voltage and the compensation voltage. This period may be referred to as a threshold voltage compensation period or a data writing period.

Also, when the scan line SLi4 is the i-th scan line, since the seventh transistor T7 may be in a turned-on state, the anode of the light emitting element LD and the initialization line INTL may be connected to each other, and the light emitting element LD may be initialized with the amount of charge corresponding to a voltage difference between the initialization voltage and the second power source voltage.

Thereafter, as an emission signal of a turn-on level is applied to the i-th emission line ELi, the transistors T5 and T6 may be turned on. Accordingly, a driving current path connecting the first power source line ELVDDL, the fifth transistor T5, the first transistor T1, the sixth transistor T6, the light emitting element LD, and the second power source line ELVSSL may be formed.

The amount of driving current flowing through the first electrode and the second electrode of the first transistor T1 may be adjusted according to the voltage maintained in the storage capacitor Cst. The light emitting element LD may emit light with a luminance corresponding to the amount of driving current. The light emitting element LD may emit light until the emission signal of the turn-off level is applied to the emission line ELi.

When the emission signal is at the turn-on level, sub-pixels receiving the emission signal may be in a display state. Accordingly, a period in which the emission signal is at the turn-on level may be referred to as an emission period EP (or emission allowable period). Also, when the emission signal is at the turn-off level, sub-pixels receiving the emission signal may be in a non-display state. Accordingly, a period in which the emission signal is at the turn-off level may be referred to as a non-emission period NEP or an emission disallowing period.

The non-emission period NEP described with reference to FIG. 3 may be a period for preventing the sub-pixel SPXij from emitting light with an undesired luminance during an initialization period and the data writing period.

One or more non-emission periods NEP may be additionally provided while data written in the sub-pixel SPXij is maintained (for example, one frame period). This may be to effectively express a low grayscale by reducing the emission period EP of the sub-pixel SPXij, or to smoothly blur the motion of an image.

Figure 4:
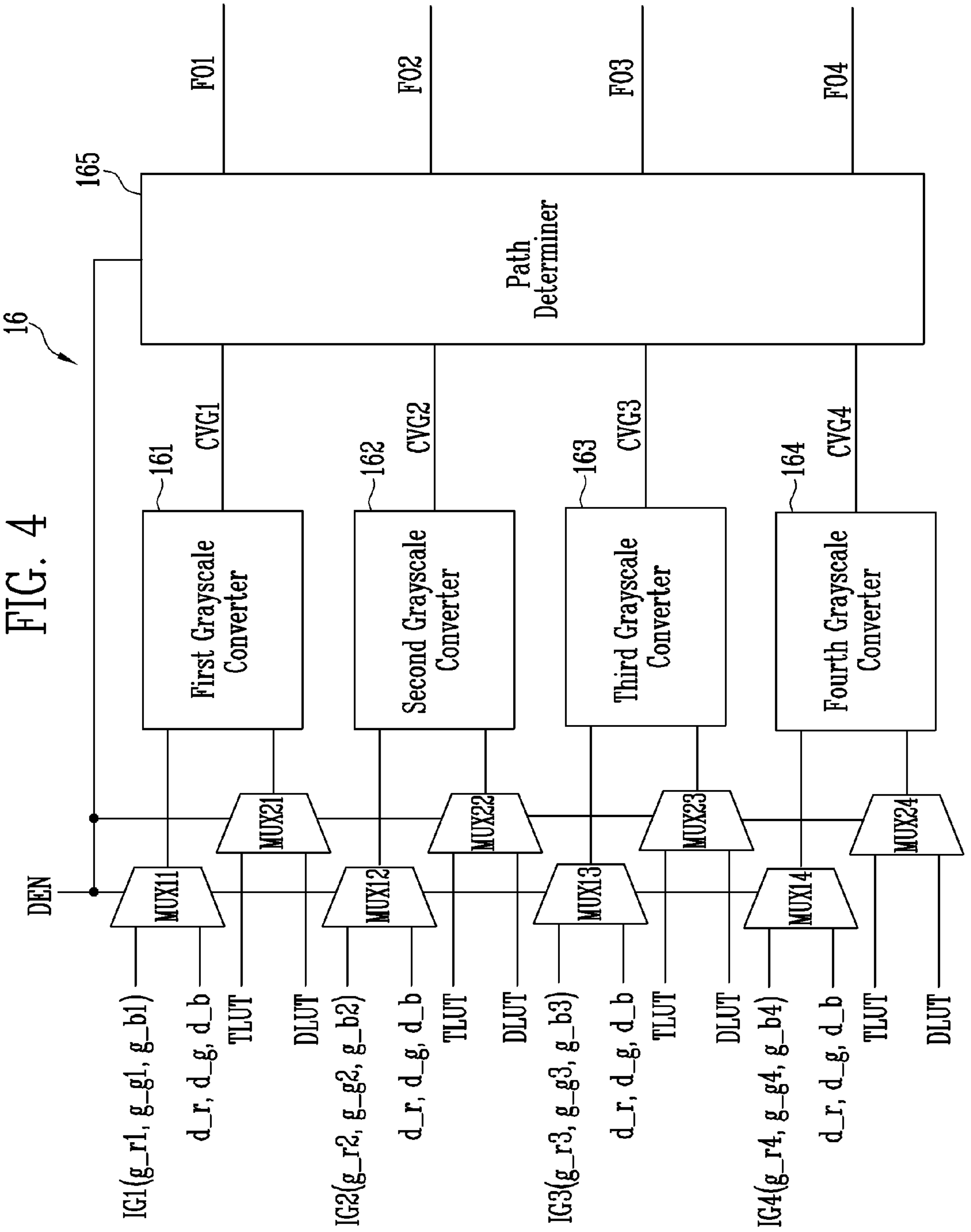
FIG. 4 is a block diagram for explaining a color controller according to an embodiment of the present disclosure.
Figure 5:
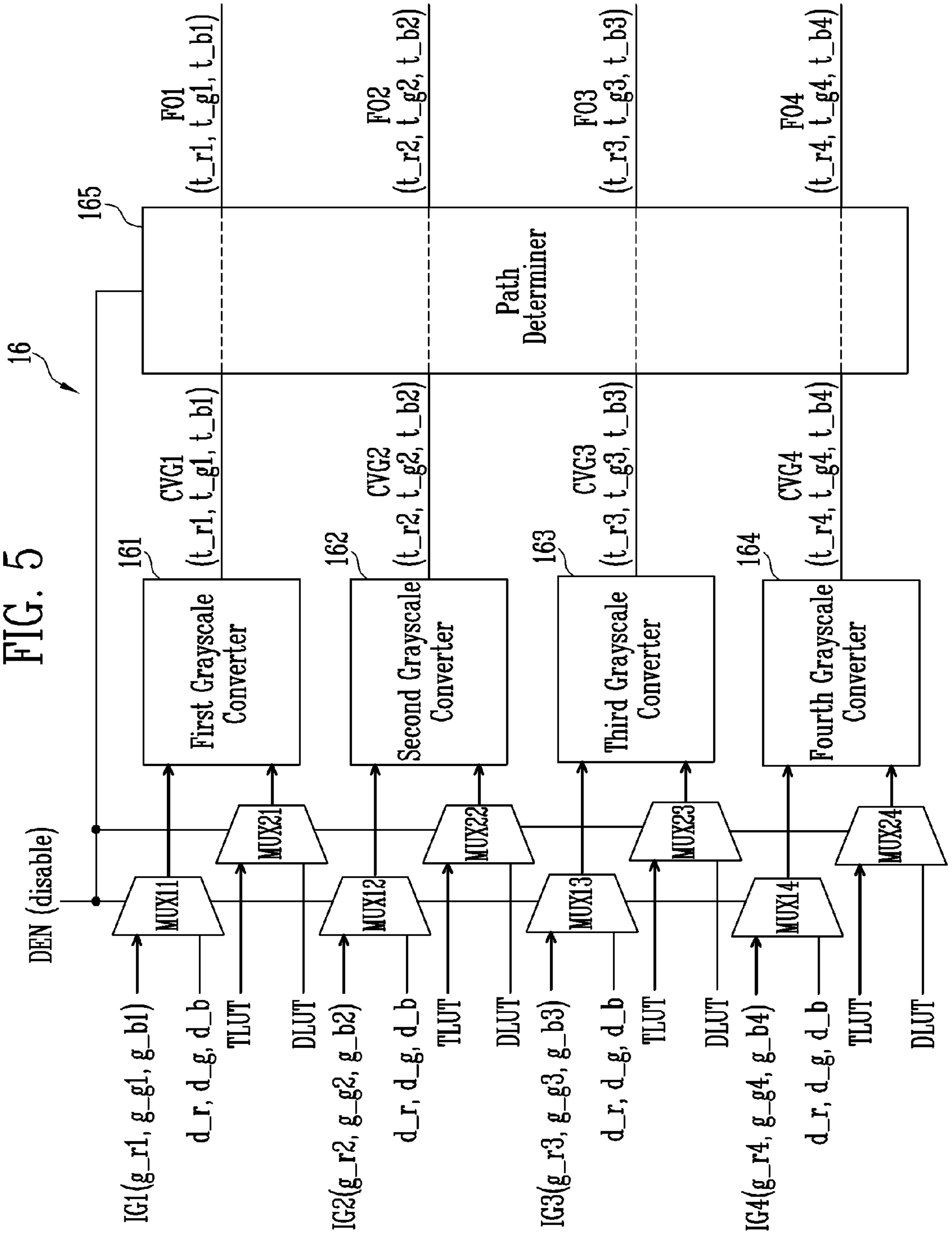
FIG. 5 is a block diagram for explaining a case in which all grayscale converters of the color controller operate normally.
Figure 6:
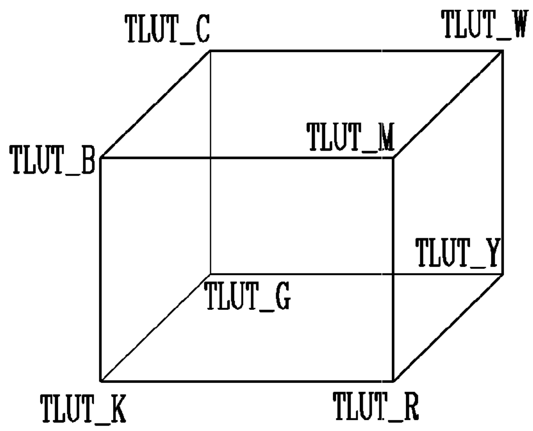
FIG. 6 is a hybrid diagram for explaining a case in which all grayscale converters of the color controller operate normally.
Figure 7:
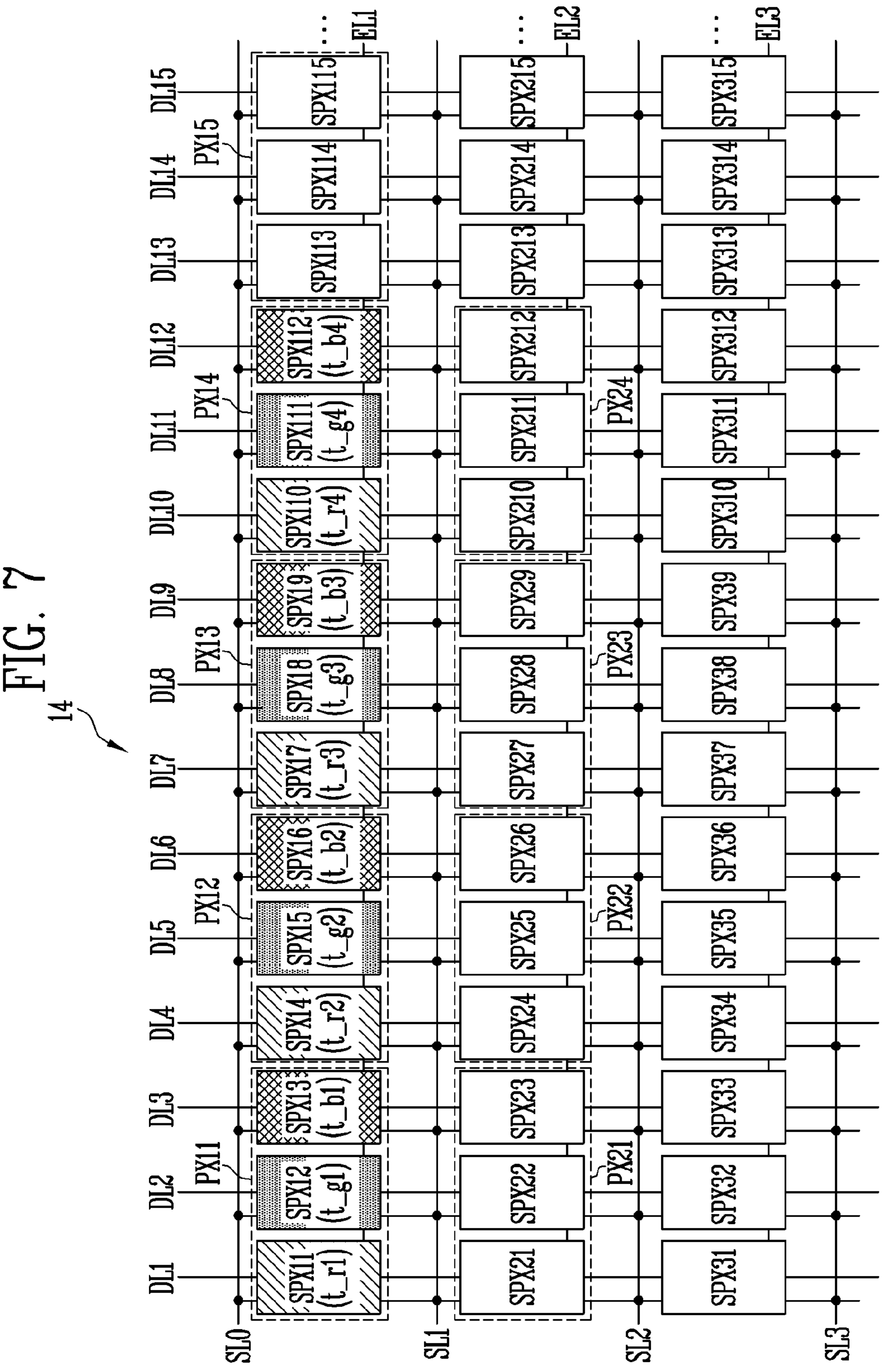
FIG. 7 is a pixel matrix diagram for explaining a case in which all grayscale converters of the color controller operate normally.

FIG. 4 is presented for explaining a color controller according to an embodiment of the present disclosure. FIGS. 5 to 7 are presented for explaining a case in which all grayscale converters of the color controller operate normally.

Referring to FIG. 4, the color controller 16 according to an embodiment of the present disclosure may include a plurality of first multiplexers MUX11, MUX12, MUX13, and MUX14, a plurality of second multiplexers MUX21, MUX22, MUX23, and MUX24, a plurality of grayscale converters 161, 162, 163, and 164, and a path determiner 165.

As described above, the color controller 16 may convert input grayscales for each pixel row into output grayscales based on user setting parameters.

Referring out of sequence to FIG. 7, for example, a first pixel row may include pixels PX11, PX12, PX13, PX14, PX15, . . . connected to the same scan lines SL0 and SL1 and emission line EL1. The pixels PX11, PX12, PX13, PX14, PX15, . . . of the first pixel row may include sub-pixels SPX11 to SPX115, . . . . A second pixel row may include pixels PX21, PX22, PX23, PX24, . . . connected to the same scan lines SL1 and SL2 and emission line EL2. The pixels PX21, PX22, PX23, PX24, . . . of the second pixel row may include sub-pixels SPX21 to SPX215, . . . . A third pixel row may include pixels connected to the same scan lines SL2 and SL3 and emission line EL3. The pixels of the third pixel row may include sub-pixels SPX31 to SPX315, . . . .

Referring back to FIG. 4, the grayscale converters 161, 162, 163, and 164 may convert input grayscales IG1, IG2, IG3, and IG4 for a plurality of target pixels PX11, PX12, PX13, and PX14 corresponding to a part of a pixel row into output grayscales CVG1, CVG2, CVG3, and CVG4 in parallel. The target pixels PX11, PX12, PX13, and PX14 may be most adjacent to each other. In the present embodiment, it is assumed that the color controller 16 includes four grayscale converters 161, 162, 163, and 164, and can simultaneously convert grayscales for four target pixels.

For example, when the grayscale conversion for first target pixels PX11, PX12, PX13, and PX14 of the first pixel row is finished, the grayscale converters 161, 162, 163, and 164 may convert grayscales for second target pixels PX15, . . . of the first pixel row. Also, when the grayscale conversion for the first pixel row is finished, the grayscale converters 161, 162, 163, and 164 may convert grayscales for first target pixels PX21, PX22, PX23, and PX24 of the second pixel row. As such, the grayscale converters 161, 162, 163, and 164 may convert grayscales for all pixels included in each pixel row.

Hereinafter, for convenience of description, examples may be described based on the first target pixels PX11, PX12, PX13, and PX14 of the first pixel row. However, as described above, all pixels of the pixel unit 14 may be target pixels, and duplicate descriptions thereof may be omitted.

The first multiplexers MUX11, MUX12, MUX13, and MUX14 may provide the input grayscales IG1, IG2, IG3, and IG4 in a normal mode and provide diagnostic input grayscales d_r, d_g, and d_b in a diagnostic mode. For example, the first multiplexers MUX11, MUX12, MUX13, and MUX14 may operate in the normal mode when receiving a diagnostic signal DEN of a disable level, and may operate in the diagnostic mode when receiving a diagnostic signal DEN of an enable level.

The second multiplexers MUX21, MUX22, MUX23, and MUX24 may provide user setting parameters TLUT in the normal mode and provide diagnostic parameters DLUT in the diagnostic mode. For example, the second multiplexers MUX21, MUX22, MUX23, and MUX24 may operate in the normal mode when receiving the diagnostic signal DEN of the disable level, and may operate in the diagnostic mode when receiving the diagnostic signal DEN of the enable level.

The grayscale converters 161, 162, 163, and 164 may convert the input grayscales IG1, IG2, IG3, and IG4 into output grayscales based on the user setting parameters TLUT in the normal mode, and may convert the diagnostic input grayscales d_r, d_g, and d_b into diagnostic output grayscales based on the diagnostic parameters DLUT in the diagnostic mode.

FIGS. 5-7 are referenced for explaining a case in which all grayscale converters of the color controller operate normally. An operation of any one grayscale converter may be described with reference to FIG. 6.

A grayscale converter may generate output grayscales t_r, t_g, and t_b by applying parameters TLUT_R, TLUT_G, TLUT_B, TLUT_C, TLUT_M, TLUT_Y, TLUT_W, and TLUT_K to input grayscales g_r, g_g, and g_b. The grayscales g_r and t_r may be first color grayscales, the grayscales g_g and t_g may be second color grayscales, and the grayscales g_b and t_b may be third color grayscales. It is assumed that the first color is red, the second color is green, and the third color is blue.

The input grayscales g_r, g_g, and g_b may be changeable values as input grayscales of an input image in the normal mode, or may be preset fixed values as diagnostic input grayscales in the diagnostic mode. The parameters TLUT_R, TLUT_G, TLUT_B, TLUT_C, TLUT_M, TLUT_Y, TLUT_W, and TLUT_K may be user setting parameters that can be changed by a user setting in the normal mode, or may be preset fixed values in the diagnostic mode. In the diagnostic mode, since the diagnostic parameters and the diagnostic input grayscales are fixed values, the diagnostic output grayscales may also be preset fixed values (expected values).

For example, the parameter TLUT_R may be set to [246, 000, 000] as a red definition value. Here, the first factor 246 may indicate a red grayscale, the second factor 000 may indicate a green grayscale, and the third factor 000 may indicate a blue grayscale. Hereinafter, such a description may be omitted. The parameter TLUT_G may be set to [8, 235, 000] as a green definition value. The parameter TLUT_B may be set to [1, 000, 205] as a blue definition value. The parameter TLUT_C may be set to [9, 235, 205] as a cyan definition value. The parameter TLUT_M may be set to [247, 000, 205] as a magenta definition value. The parameter TLUT_Y may be set to [254, 235, 000] as a yellow definition value. The parameter TLUT_W may be set to [255, 235, 205] as a white definition value. The parameter TLUT_K may be set to [000, 000, 000] as a black definition value.

The grayscale converter may generate the output grayscales t_r, t_g, and t_b within a range of the parameters TLUT_R, TLUT_G, TLUT_B, TLUT_C, TLUT_M, TLUT_Y, TLUT_W, and TLUT_K. In FIG. 6, for a more intuitive understanding, a cube composed of three coordinate axes TLUT_R, TLUT_G, and TLUT_B where the parameter TLUT_K constitutes an origin and orthogonal to each other is shown.

The output grayscales t_r, t_g, and t_b may be calculated using the table shown in FIG. 6 and example Equations 1, 2, and 3 as set forth below, without limitation thereto. Equations 1, 2, and 3 may be independently performed by each of the grayscale converters 161, 162, 163, and 164. For example, when Equations 1, 2, and 3 are performed by a first grayscale converter 161, the calculated output grayscales t_r, t_g, and t_b may correspond to a first output grayscale CVG1. When Equations 1, 2, and 3 are performed by a second grayscale converter 162, the calculated output grayscales t_r, t_g, and t_b may correspond to a second output grayscale CVG2. When Equations 1, 2, and 3 are performed by a third grayscale converter 163, the calculated output grayscales t_r, t_g, and t_b may correspond to a third output grayscale CVG3. When Equations 1, 2, and 3 are performed by a fourth grayscale converter 164, the calculated output grayscales t_r, t_g, and t_b may correspond to a fourth output grayscale CVG4 (see FIG. 4).

$$t\_r = \mathrm{TLUT}\_K\_r + C1\_r * g\_r / r\_\mathrm{step} + C2\_r * g\_g / g\_\mathrm{step} + C3\_r * g\_b / b\_\mathrm{step} \quad \text{[Equation 1]}$$

$$t\_g = \mathrm{TLUT}\_K\_g + C1\_g * g\_r / r\_\mathrm{step} + C2\_g * g\_g / g\_\mathrm{step} + C3\_g * g\_b / b\_\mathrm{step} \quad \text{[Equation 2]}$$

$$t\_b = \mathrm{TLUT}\_K\_b + C1\_b * g\_r / r\_\mathrm{step} + C2\_b * g\_g / g\_\mathrm{step} + C3\_b * g\_b / b\_\mathrm{step} \quad \text{[Equation 3]}$$

Here, TLUT_K_r may be the red grayscale of the parameter TLUT_K, TLUT_K_g may be the green grayscale of the parameter TLUT_K, TLUT_K_b may be the blue grayscale of the parameter TLUT_K, C1_r may be the red grayscale of C1 calculated according to each of the cases A1, A2, A3, A4, A5, and A6 of the table of FIG. 6, C1_g may be the green grayscale of C1 calculated according to each of the cases A1 to A6 of the table, C1_b may be the blue grayscale of C1 calculated according to each of the cases A1 to A6 of the table, C2_r may be the red grayscale of C2 calculated according to each of the cases A1 to A6 of the table, C2_g may be the green grayscale of C2 calculated according to each of the cases A1 to A6 of the table, C2_b may be the blue grayscale of C2 calculated according to each of the cases A1 to A6 of the table, C3_r may be the red grayscale of C3 calculated according to each of the cases A1 to A6 of the table, C3_g may be the green grayscale of C3 calculated according to each of the cases A1 to A6 of the table, and C3_b may be the blue grayscale of C3 calculated according to each of the cases A1 to A6 of the table. r_step, g_step, and b_step may be constants. For example, each of r_step, g_step, and b_step may be 128.

Referring to the table of FIG. 6, in a first case A1 in which the first color grayscale g_r is greater than the second color grayscale g_g and the second color grayscale g_g is greater than the third color grayscale g_b, C1 may correspond to a value obtained by subtracting TLUT_K from TLUT_R, C2 may correspond to a value obtained by subtracting TLUT_R from TLUT_C, and C3 may correspond to a value obtained by subtracting TLUT_Y from TLUT_W. In a second case A2 in which the first color grayscale g_r is greater than the third color grayscale g_b and the third color grayscale g_b is greater than the second color grayscale g_g, C1 may correspond to a value obtained by subtracting TLUT_K from TLUT_R, C2 may correspond to a value obtained by subtracting TLUT_M from TLUT_W, and C3 may correspond to a value obtained by subtracting TLUT_R from TLUT_M. In a third case A3 in which the third color grayscale g_b is greater than the first color grayscale g_r and the first color grayscale g_r is greater than the second color grayscale g_g, C1 may correspond to a value obtained by subtracting TLUT_B from TLUT_M, C2 may correspond to a value obtained by subtracting TLUT_M from TLUT_W, and C3 may correspond to a value obtained by subtracting TLUT_K from TLUT_B. In a fourth case A4 in which the second color grayscale g_g is greater than the first color grayscale g_r and the first color grayscale g_r is greater than the third color grayscale g_b, C1 may correspond to a value obtained by subtracting TLUT_G from TLUT_Y, C2 may correspond to a value obtained by subtracting TLUT_K from TLUT_G, and C3 may correspond to a value obtained by subtracting TLUT_Y from TLUT_W. In a fifth case A5 in which the second color grayscale g_g is greater than the third color grayscale g_b and the third color grayscale g_b is greater than the first color grayscale g_r, C1 may correspond to a value obtained by subtracting TLUT_C from TLUT_W, C2 may correspond to a value obtained by subtracting TLUT_K from TLUT_G, and C3 may correspond to a value obtained by subtracting TLUT_G from TLUT_C. In a sixth case A6 in which the third color grayscale g_b is greater than the second color grayscale g_g and the second color grayscale g_g is greater than the first color grayscale g_r, C1 may correspond to a value obtained by subtracting TLUT_C from TLUT_W, C2 may correspond to a value obtained by subtracting TLUT_B from TLUT_C, and C3 may correspond to a value obtained by subtracting TLUT_K from TLUT_B.

In the embodiment described with reference to FIG. 6, it is assumed that each of the input color grayscales g_r, g_g, and g_b is 8 bits and each of the output color grayscales t_r, t_g, and t_b is 10 bits. However, in another embodiment, each of the input color grayscales g_r, g_g, and g_b may be 10 bits and each of the output color grayscales t_r, t_g, and t_b may be 12 bits. For example, in the diagnostic mode, a first color grayscale d_r of the diagnostic input grayscales may be 1023, a second color grayscale d_g of the diagnostic input grayscales may be 816, and the third color grayscale d_b of the diagnostic input grayscales may be 408. In this case, the parameter TLUT_R among the diagnostic parameters DLUT may be set to [255, 000, 000]. The parameter TLUT_G among the diagnostic parameters DLUT may be set to [000, 255, 000]. The parameter TLUT_B among the diagnostic parameters DLUT may be set to [000, 000, 255]. The parameter TLUT_C among the diagnostic parameters DLUT may be set to [000, 255, 255]. The parameter TLUT_M among the diagnostic parameters DLUT may be set to [255, 000, 255]. The parameter TLUT_Y among the diagnostic parameters DLUT may be set to [255, 255, 000]. The parameter TLUT_W among the diagnostic parameters DLUT may be set to [255, 255, 255]. In this case, in the diagnostic mode, a first color grayscale do_r of the diagnostic output grayscales may be 4092, a second color grayscale do_g of the diagnostic output grayscales may be 3264, and a third color grayscale do_b of the diagnostic output grayscales may be 1631.

The first grayscale converter 161 may convert a first input grayscale IG1 for a first target pixel PX11 into the first output grayscale CVG1. The first input grayscale IG1 may include a first color grayscale g_r1 for a sub-pixel SPX11, a second color grayscale g_g1 for a sub-pixel SPX12, and a third color grayscale g_b1 for a sub-pixel SPX13. The first output grayscale CVG1 may include a first color grayscale t_r1 for the sub-pixel SPX11, a second color grayscale t_g1 for the sub-pixel SPX12, and a third color grayscale t_b1 for the sub-pixel SPX13 calculated by Equations 1, 2, and 3 described above with respect to the first input grayscale IG1.

The second grayscale converter 162 may convert a second input grayscale IG2 for a second target pixel PX12 into the second output grayscale CVG2. The second input grayscale IG2 may include a first color grayscale g_r2 for a sub-pixel SPX14, a second color grayscale g_g2 for a sub-pixel SPX15, and a third color grayscale g_b2 for a sub-pixel SPX16. The second output grayscale CVG2 may include a first color grayscale t_r2 for the sub-pixel SPX14, a second color grayscale t_g2 for the sub-pixel SPX15, and a third color grayscale t_b2 for the sub-pixel SPX16 calculated by Equations 1, 2, and 3 described above with respect to the second input grayscale IG2.

The third grayscale converter 163 may convert a third input grayscale IG3 for a third target pixel PX13 into the third output grayscale CVG3. The third input grayscale IG3 may include a first color grayscale g_r3 for a sub-pixel SPX17, a second color grayscale g_g3 for a sub-pixel SPX18, and a third color grayscale g_b3 for a sub-pixel SPX19. The third output grayscale CVG3 may include a first color grayscale t_r3 for the sub-pixel SPX17, a second color grayscale t_g3 for the sub-pixel SPX18, and a third color grayscale t_b3 for the sub-pixel SPX19 calculated by Equations 1, 2, and 3 described above with respect to the third input grayscale IG3.

The fourth grayscale converter 164 may convert a fourth input grayscale IG4 for a fourth target pixel PX14 into the fourth output grayscale CVG4. The fourth input grayscale IG4 may include a first color grayscale g_r4 for a sub-pixel SPX110, a second color grayscale g_g4 for a sub-pixel SPX111, and a third color grayscale g_b4 for a sub-pixel SPX112. The fourth output grayscale CVG4 may include a first color grayscale t_r4 for the sub-pixel SPX110, a second color grayscale t_g4 for the sub-pixel SPX111, and a third color grayscale t_b4 for the sub-pixel SPX112 calculated by Equations 1, 2, and 3 described above with respect to the fourth input grayscale IG4.

The path determiner 165 may match the output grayscales CVG1, CVG2, CVG3, and CVG4 with the plurality of target pixels PX11, PX12, PX13, and PX14. For example, when all of the first grayscale converter 161, the second grayscale converter 162, the third grayscale converter 163, and the fourth grayscale converter 164 are diagnosed as normal, the path determiner 165 may match the first output grayscale CVG1 to the first target pixel PX11, match the second output grayscale CVG2 to the second target pixel PX12, match the third output grayscale CVG3 to the third target pixel PX13, and match the fourth output grayscale CVG4 to the fourth target pixel PX14. That is, when the basic setting (default setting) is diagnosed or when all of the grayscale converters 161, 162, 163, and 164 are diagnosed as normal, the path determiner 165 may provide the first output grayscale CVG1 as a first output FO1 for the first target pixel PX11, provide the second output grayscale CVG2 as a second output FO2 for the second target pixel PX12, provide the third output grayscale CVG3 as a third output FO3 for the third target pixel PX13, and provide the fourth output grayscale CVG4 as a fourth output FO4 for the fourth target pixel PX14.

In this case, the first output FO1 may include the first color grayscale t_r1, the second color grayscale t_g1, and the third color grayscale t_b1 equal to the first output grayscale CVG1. The data driver 12 may convert the first color grayscale t_r1 into a corresponding data voltage and supply the data voltage to the sub-pixel SPX11, convert the second color grayscale t_g1 into a corresponding data voltage and supply the data voltage to the sub-pixel SPX12, and convert the third color grayscale t_b1 into a corresponding data voltage and supply the data voltage the sub-pixel SPX13.

In this case, the second output FO2 may include the first color grayscale t_r2, the second color grayscale t_g2, and the third color grayscale t_b2 equal to the second output grayscale CVG2. The data driver 12 may convert the first color grayscale t_r2 into a corresponding data voltage and supply the data voltage to the sub-pixel SPX14, convert the second color grayscale t_g2 into a corresponding data voltage and supply the data voltage to the sub-pixel SPX15, and convert the third color grayscale t_b2 into a corresponding data voltage and supply the data voltage to the sub-pixel SPX16.

In this case, the third output FO3 may include the first color grayscale t_r3, the second color grayscale t_g3, and the third color grayscale t_b3 equal to the third output grayscale CVG3. The data driver 12 may convert the first color grayscale t_r3 into a corresponding data voltage and supply the data voltage to the sub-pixel SPX17, convert the second color grayscale t_g3 into a corresponding data voltage and supply the data voltage to the sub-pixel SPX18, and convert the third color grayscale t_b3 into a corresponding data voltage and supply the data voltage to the sub-pixel SPX19.

In this case, the fourth output FO4 may include the first color grayscale t_r4, the second color grayscale t_g4, and the third color grayscale t_b4 equal to the fourth output grayscale CVG4. The data driver 12 may convert the first color grayscale t_r4 into a corresponding data voltage and supply the data voltage to the sub-pixel SPX110, convert the second color grayscale t_g4 into a corresponding data voltage and supply the data voltage to the sub-pixel SPX111, and convert the third color grayscale t_b4 into a corresponding data voltage and supply the data voltage to the sub-pixel SPX112.

Figure 8:
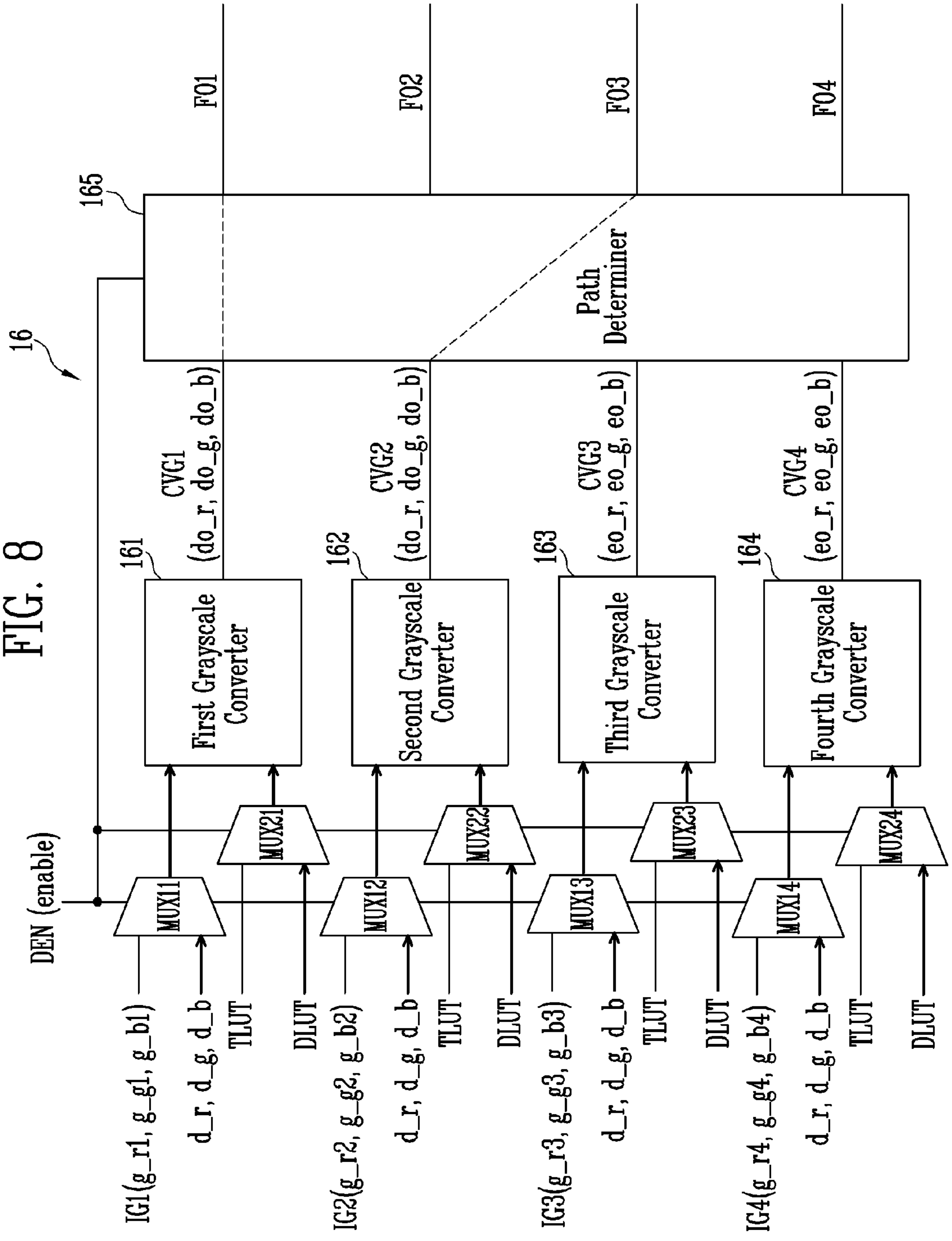
FIG. 8 is a block diagram for explaining a case in which two grayscale converters of the color controller fail.
Figure 9:
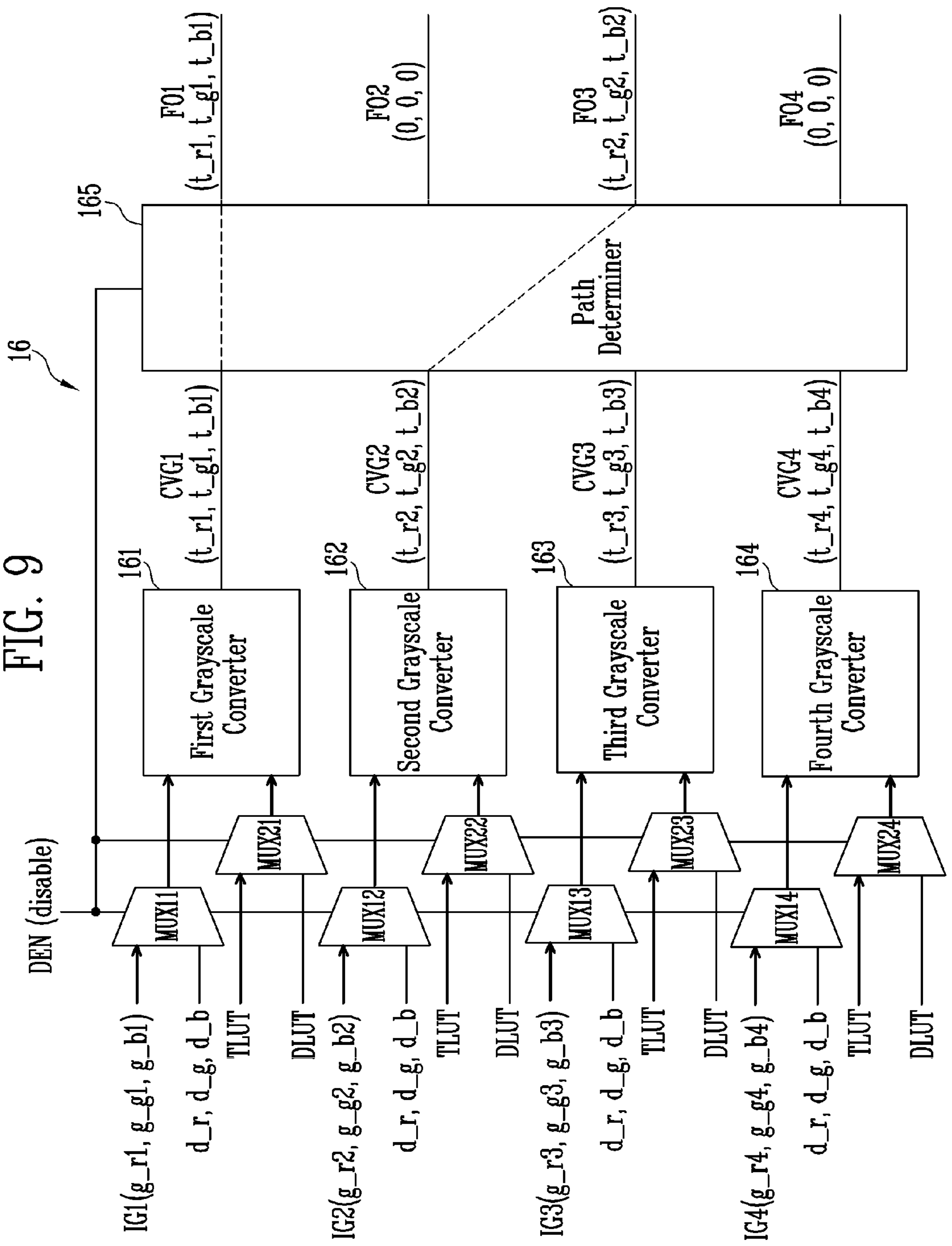
FIG. 9 is a block diagram for explaining a case in which two grayscale converters of the color controller fail.
Figure 10:
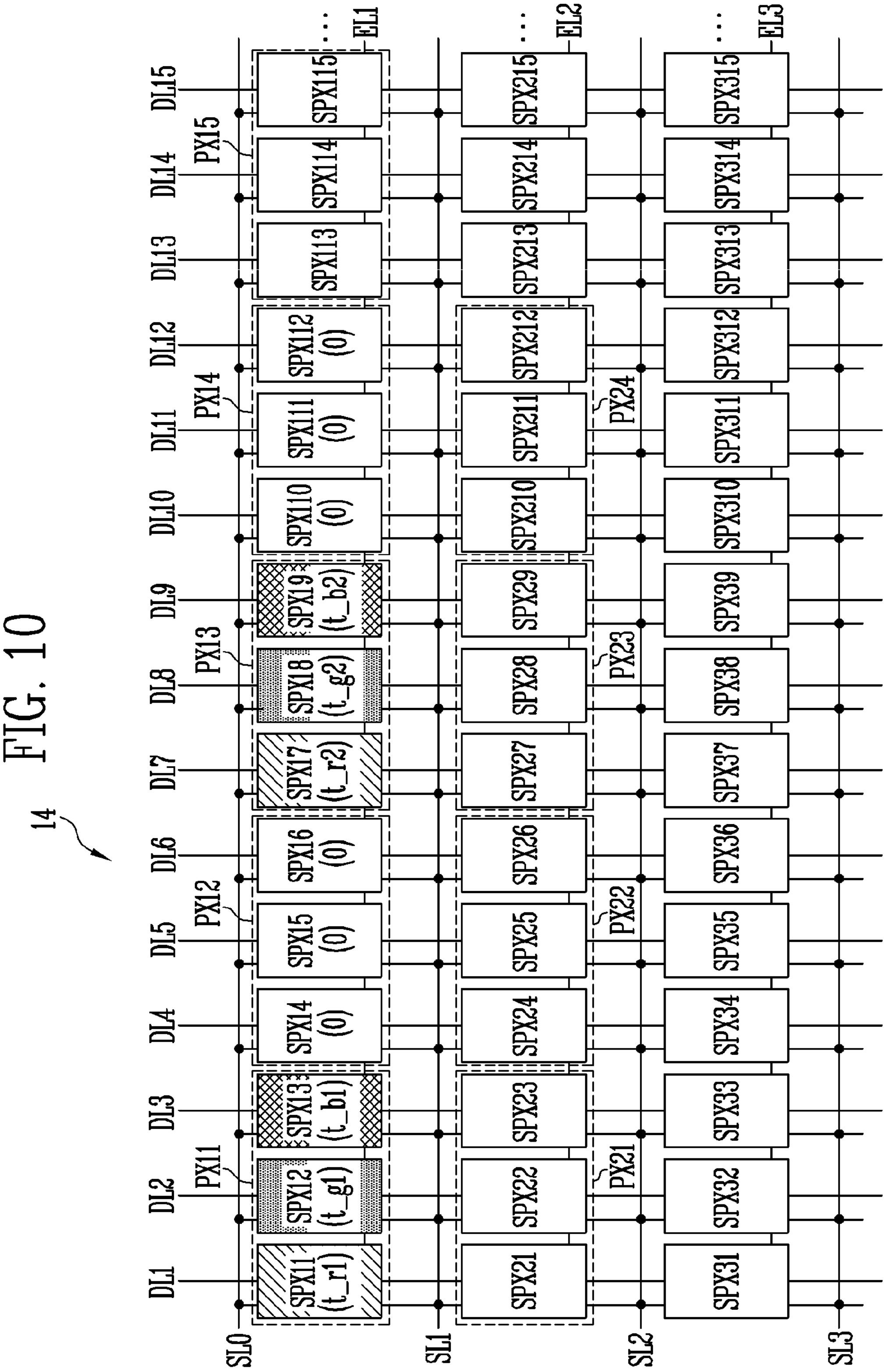
FIG. 10 is a pixel matrix diagram for explaining a case in which two grayscale converters of the color controller fail.

FIGS. 8 to 10 are presented for explaining a case in which two grayscale converters of the color controller fail.

Referring to FIG. 8, a case in which the diagnostic signal DEN is at an enable level is shown. According to the diagnostic signal DEN of the enable level, the first multiplexers MUX11, MUX12, MUX13, and MUX14 may provide the diagnostic input grayscales d_r, d_g, and d_b, and the second multiplexers MUX21, MUX22, MUX23 and MUX24 may provide the diagnostic parameters DLUT.

In this case, it is assumed that the first grayscale converter 161 and the second grayscale converter 162 operate normally, and the third grayscale converter 163 and the fourth grayscale converter 164 fail. The first grayscale converter 161 and the second grayscale converter 162 may output diagnostic output grayscales do_r, do_g, and do_b equal to the expected values in response to the diagnostic input grayscales d_r, d_g, and d_b and the diagnostic parameters DLUT that are predetermined input values. On the other hand, the third grayscale converter 163 and the fourth grayscale converter 164 may output diagnostic output grayscales eo_r, eo_g, and eo_b different from the expected values in response to the diagnostic input grayscales d_r, d_g, and d_b and the diagnostic parameters DLUT. The path determiner 165 may diagnose the first grayscale converter 161 and the second grayscale converter 162 that output the diagnostic output grayscales do_r, do_g, and do_b equal to the expected values as normal by using an internal comparator. Meanwhile, the path determiner 165 may diagnose the third grayscale converter 163 and the fourth grayscale converter 164 that output the diagnostic output grayscales eo_r, eo_g, and eo_b different from the expected values as failures by using the internal comparator.

When two of the first grayscale converter 161, the second grayscale converter 162, the third grayscale converter 163, and the fourth grayscale converter 164 are diagnosed as abnormal and the other two are diagnosed as normal, the path determiner 165 may match the output grayscales of the grayscale converters 161 and 162 diagnosed as normal to the first target pixel PX11 and the third target pixel PX13. Referring to FIG. 9, the first output FO1 for the first target pixel PX11 may have the same values t_r1, t_g1, and t_b1 as the first output grayscale CVG1, and the third output FO3 for the third target pixel PX13 may have the same values t_r2, t_g2, and t_b2 as the second output grayscale CVG2. The first target pixel PX11 and the third target pixel PX13 may be spaced apart from each other by an interval of one pixel within the same pixel row.

When two of the first grayscale converter 161, the second grayscale converter 162, the third grayscale converter 163, and the fourth grayscale converter 164 are diagnosed as abnormal and the other two are diagnosed as normal, the path determiner 165 may provide black grayscales (0, 0, 0) to the second target pixel PX12 and the fourth target pixel PX14. The outputs of the two grayscale converters diagnosed as normal may be provided to the first target pixel PX11 and the third target pixel PX13. Referring to FIG. 9, the path determiner 165 may not use incorrect output grayscales CVG3 and CVG4.

In FIGS. 8 and 9, it is assumed that the third grayscale converter 163 and the fourth grayscale converter 164 fail. However, if any two of the four grayscale converters 161, 162, 163, and 164 fail and the other two are normal, the teachings of the present embodiment may be similarly applied. For example, when the first grayscale converter 161 and the second grayscale converter 162 fail, the path determiner 165 may provide the third output grayscale CVG3 of the third grayscale converter 163 as the first output FO1, and provide the fourth output grayscale CVG4 of the fourth grayscale converter 164 as the third output FO3. For example, when the first grayscale converter 161 and the third grayscale converter 163 fail, the path determiner 165 may provide the second output grayscale CVG2 of the second grayscale converter 162 as the first output FO1, and provide the fourth output grayscale CVG4 of the fourth grayscale converter 164 as the third output FO3. For example, when the first grayscale converter 161 and the fourth grayscale converter 164 fail, the path determiner 165 may provide the second output grayscale CVG2 of the second grayscale converter 162 as the first output FO1, and provide the third output grayscale CVG3 of the third grayscale converter 163 as the third output FO3. For example, when the second grayscale converter 162 and the third grayscale converter 163 fail, the path determiner 165 may provide the first output grayscale CVG1 of the first grayscale converter 161 as the first output FO1, and provide the fourth output grayscale CVG4 of the fourth grayscale converter 164 as the third output FO3. For example, when the second grayscale converter 162 and the fourth grayscale converter 164 fail, the path determiner 165 may provide the first output grayscale CVG1 of the first grayscale converter 161 as the first output FO1, and provide the third output grayscale CVG3 of the third grayscale converter 163 as the third output FO3.

Referring to FIG. 10, regardless of whether any two grayscale converters fail, since an image is displayed by the first target pixel PX11 and the third target pixel PX13 arranged at regular intervals, the user can view the uniform image. In another embodiment, regardless of whether any two grayscale converters fail, an image may be displayed by the second target pixel PX12 and the fourth target pixel PX14 arranged at regular intervals.

Figure 11:
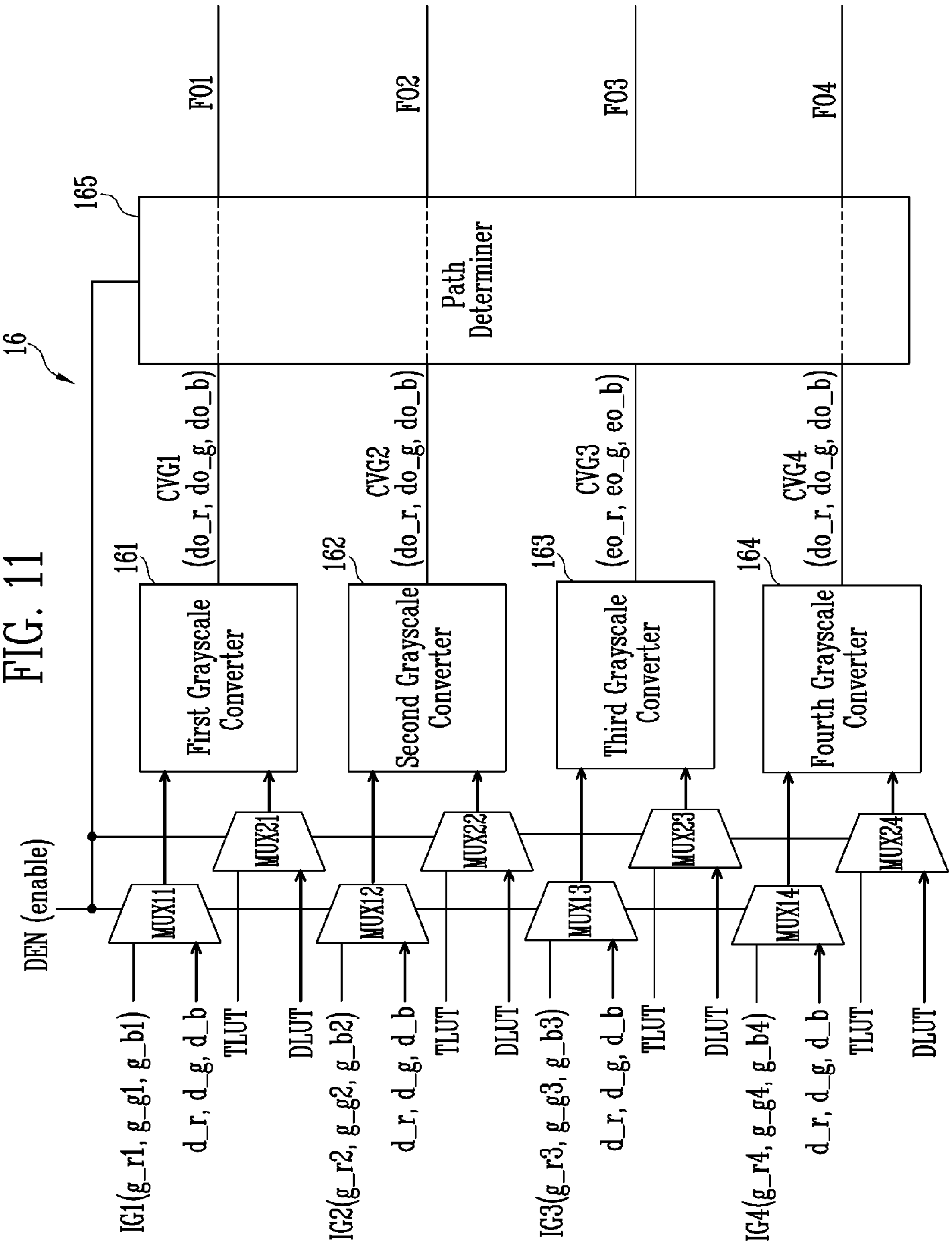
FIG. 11 is a block diagram for explaining a case in which one grayscale converter of the color controller fails.

FIG. 11 is presented for explaining a case in which one grayscale converter of the color controller fails.

Referring to FIG. 11, when one (for example, the third grayscale converter 163) of the first grayscale converter 161, the second grayscale converter 162, the third grayscale converter 163, and the fourth grayscale converter 164 is diagnosed as abnormal and the other three are diagnosed as normal, the path determiner 165 may match output grayscales CVG1, CVG2, and CVG4 of the three grayscale converters 161, 162, and 164 diagnosed as normal with original target pixels PX11, PX12, and PX14, and provide a black grayscale to the target pixel PX13 that does not match the output grayscales CVG1, CVG2, and CVG4. Meanwhile, when one (for example, the first grayscale converter 161) of the first grayscale converter 161, the second grayscale converter 162, the third grayscale converter 163, and the fourth grayscale converter 164 is diagnosed as abnormal and the other three are diagnosed as normal, the path determiner 165 may match output grayscales CVG2, CVG3, and CVG4 of the three grayscale converters 162, 163, and 164 diagnosed as normal with original target pixels PX12, PX13, and PX14, and provide a black grayscale to the target pixel PX11 that does not match the output grayscales CVG2, CVG3, and CVG4. Similarly, when one (for example, the second grayscale converter 162) of the first grayscale converter 161, the second grayscale converter 162, the third grayscale converter 163, and the fourth grayscale converter 164 is diagnosed as abnormal and the other three are diagnosed as normal, the path determiner 165 may match output grayscales CVG1, CVG3, and CVG4 of the three grayscale converters 161, 163, and 164 diagnosed as normal with original target pixels PX11, PX13, and PX14, and provide a black grayscale to the target pixel PX12 that does not match the output grayscales CVG1, CVG3, and CVG4. When one (for example, the fourth grayscale converter 164) of the first grayscale converter 161, the second grayscale converter 162, the third grayscale converter 163, and the fourth grayscale converter 164 is diagnosed as abnormal and the other three are diagnosed as normal, the path determiner 165 may match outputs grayscales CVG1, CVG2, and CVG3 of the three grayscale converters 161, 162, and 163 diagnosed as normal with original target pixels PX11, PX12, and PX13, and provide a black grayscale to the target pixel PX14 that does not match the output grayscales CVG1, CVG2, and CVG3.

Unlike the case where two of the first grayscale converter 161, the second grayscale converter 162, the third grayscale converter 163, and the fourth grayscale converter 164 fail, in a case where one of the first grayscale converter 161, the second grayscale converter 162, the third grayscale converter 163, and the fourth grayscale converter 164 fails, the existing path may be maintained since the improvement in visibility through path adjustment is not large.

The original target pixels may refer to target pixels PX11, PX12, PX13, and PX14 to which their output grayscales CVG1, CVG2, CVG3, and CVG4 are transmitted when all of the grayscale converters 161, 162, 163, and 164 are normal. For example, an original target pixel of the first output grayscale CVG1 may be the first target pixel PX11, an original target pixel of the second output grayscale CVG2 may be the second target pixel PX12, an original target pixel of the third output grayscale CVG3 may be the third target pixel PX13, and an original target pixel of the fourth output grayscale CVG4 may be the fourth target pixel PX14.

Figure 12:
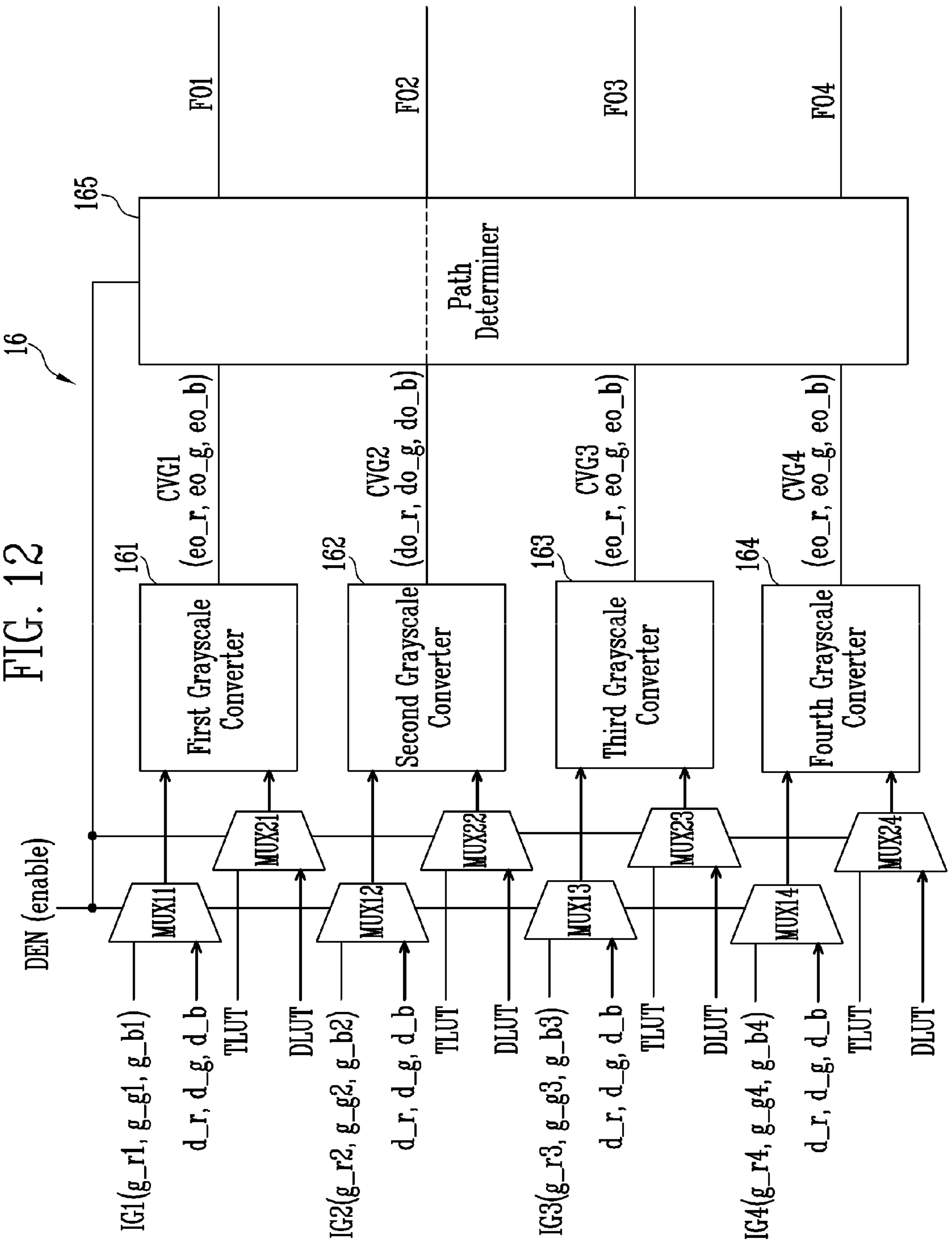
FIG. 12 is a block diagram for explaining a case in which three grayscale converters of the color controller fail.

FIG. 12 is presented for explaining a case in which three grayscale converters of the color controller fail.

Referring to FIG. 12, when three of the first grayscale converter 161, the second grayscale converter 162, the third grayscale converter 163, and the fourth grayscale converter 164 are diagnosed as abnormal and the other one (for example, the second grayscale converter 162) is diagnosed as normal, the path determiner 165 may match an output grayscale of the one grayscale converter 162 diagnosed as normal with an original target pixel PX12, and provide black grayscales to the target pixels PX11, PX13, and PX14 that do not match the output grayscale. Meanwhile, when three of the first grayscale converter 161, the second grayscale converter 162, the third grayscale converter 163, and the fourth grayscale converter 164 are diagnosed as abnormal and the other one (For example, the first grayscale converter 161) is diagnosed as normal, the path determiner 165 may match an output grayscale of the one grayscale converter 161 diagnosed as normal with an original target pixel PX11, and provide black grayscales to the target pixels PX12, PX13, and PX14 that do not match the output grayscale. Similarly, when three of the first grayscale converter 161, the second grayscale converter 162, the third grayscale converter 163, and the fourth grayscale converter 164 are diagnosed as abnormal and the other one (for example, the third grayscale converter 163) is diagnosed as normal, the path determiner 165 may match an output grayscale of the one grayscale converter 163 diagnosed as normal with an original target pixel PX13, and provide black grayscales to the target pixels PX11, PX12, and PX14 that do not match the output grayscale. When three of the first grayscale converter 161, the second grayscale converter 162, the third grayscale converter 163, and the fourth grayscale converter 164 are diagnosed as abnormal and the other one (for example, the fourth grayscale converter 164) is diagnosed as normal, the path determiner 165 may match an output grayscale of the one grayscale converter 164 diagnosed as normal with an original target pixel PX14, and provide black grayscales to the target pixels PX11, PX12, and PX13 that do not match the output grayscale.

Unlike the case where two of the first grayscale converter 161, the second grayscale converter 162, the third grayscale converter 163, and the fourth grayscale converter 164 fail, in a case where three of the first grayscale converter 161, the second grayscale converter 162, the third grayscale converter 163, and the fourth grayscale converter 164 fail, the existing path may be maintained since the improvement in visibility through path adjustment is not large.

The display device and the driving method thereof according to the present disclosure can display an optimized image for each situation by diagnosing a failure, even if some logic circuits fail in a display driver.

The drawings referred to heretofore and the detailed description provided above are merely illustrative of the inventive concept. It is to be understood that the present disclosure has been provided for illustrative purposes and is not intended to limit the meaning or scope of the disclosure, as set forth in the claims. Therefore, those of ordinary skill in the pertinent art will appreciate that various modifications and equivalent embodiments are possible without departing from the scope of the present disclosure. Accordingly, the true scope of the inventive concept should be determined by the appended claims.

What is claimed is:

1. A display device comprising:

a pixel unit including a plurality of pixel rows;

a color controller configured to convert input grayscales for each of the pixel rows into output grayscales based on user setting parameters; and a data driver configured to supply data voltages corresponding to the output grayscales to each of the pixel rows, wherein the color controller includes:

a plurality of grayscale converters configured to convert the input grayscales for a plurality of target pixels corresponding to a part of a pixel row into the output grayscales in parallel, wherein the plurality of target pixels are most adjacent to each other; and a path determiner configured to match the output grayscales with the plurality of target pixels, wherein when an output grayscale of at least one of the plurality of grayscale converters for at least one target pixel of the plurality of target pixels is diagnosed as abnormal, said path determiner is configured to provide a black grayscale to the at least one target pixel, wherein the plurality of grayscale converters include:

a first grayscale converter configured to convert a first input grayscale for a first target pixel into a first output grayscale;

a second grayscale converter configured to convert a second input grayscale for a second target pixel into a second output grayscale;

a third grayscale converter configured to convert a third input grayscale for a third target pixel into a third output grayscale; and a fourth grayscale converter configured to convert a fourth input grayscale for a fourth target pixel into a fourth output grayscale, wherein when all of the first grayscale converter, the second grayscale converter, the third grayscale converter, and the fourth grayscale converter are diagnosed as normal, the path determiner is configured to match the first output grayscale to the first target pixel, match the second output grayscale to the second target pixel, to match the third output grayscale to the third target pixel, and to match the fourth output grayscale to the fourth target pixel, wherein when two of the first grayscale converter, the second grayscale converter, the third grayscale converter, and the fourth grayscale converter are diagnosed as abnormal and the other two are diagnosed as normal, the path determiner is configured to match output grayscales of the two grayscale converters diagnosed as normal to the first target pixel and the third target pixel, and wherein when two of the first grayscale converter, the second grayscale converter, the third grayscale converter, and the fourth grayscale converter are diagnosed as abnormal and the other two are diagnosed as normal, the path determiner is configured to provide black grayscales to the second target pixel and the fourth target pixel.

2. The display device of claim 1, wherein when one of the first grayscale converter, the second grayscale converter, the third grayscale converter, and the fourth grayscale converter is diagnosed as abnormal and the other three are diagnosed as normal, the path determiner is configured to match output grayscales of the three grayscale converters diagnosed as normal with original target pixels, and to provide a black grayscale to a target pixel not matched with the output grayscales.

3. The display device of claim 2, wherein when three of the first grayscale converter, the second grayscale converter, the third grayscale converter, and the fourth grayscale converter are diagnosed as abnormal and the other one is diagnosed as normal, the path determiner configured to match an output grayscale of the one grayscale converter diagnosed as normal with an original target pixel, and to provide black grayscales to target pixels not matched with the output grayscale.

4. The display device of claim 1,
wherein the color controller further includes:
first multiplexers configured to provide the input grayscales in a normal mode and to provide diagnostic input grayscales in a diagnostic mode; and
second multiplexers configured to provide the user setting parameters in the normal mode and to provide diagnostic parameters in the diagnostic mode,
wherein the grayscale converters are configured to convert the input grayscales into the output grayscales based on the user setting parameters in the normal mode, and to convert the diagnostic input grayscales into diagnostic output grayscales based on the diagnostic parameters in the diagnostic mode.

5. The display device of claim 4, wherein the path determiner is configured to diagnose a grayscale converter having a diagnostic output grayscale as normal when the diagnostic output grayscale is equal to an expected value in the diagnostic mode, and to diagnose the grayscale converter having the diagnostic output grayscale as abnormal when the diagnostic output grayscale is not equal to the expected value in the diagnostic mode.

6. The display device of claim 5,
wherein the user setting parameters are values that can be changed by a user setting,
wherein the input grayscales are values that can be changed according to an input image, and
wherein the diagnostic parameters, the diagnostic input grayscales, and the diagnostic output grayscales are preset fixed values.

7. A driving method of a display device comprising:
converting input grayscales for each pixel row into output grayscales based on user setting parameters; and
supplying data voltages corresponding to the output grayscales to each pixel row,
wherein the converting the input grayscales for each pixel row into the output grayscales includes:
converting the input grayscales for a plurality of target pixels corresponding to a part of a pixel row into the output grayscales in parallel, the plurality of target pixels being most adjacent to each other; and
matching the output grayscales with the plurality of target pixels,
wherein when converting an input grayscale for at least one target pixel of the plurality of target pixels is diagnosed as abnormally performed, said matching includes providing a black grayscale to the at least one target pixels,
wherein said converting the input grayscales into the output grayscales in parallel includes:
converting a first input grayscale for a first target pixel into a first output grayscale;
converting a second input grayscale for a second target pixel into a second output grayscale;
converting a third input grayscale for a third target pixel into a third output grayscale; and
converting a fourth input grayscale for a fourth target pixel into a fourth output grayscale,
wherein said matching the output grayscales with the plurality of target pixels includes:
matching the first output grayscale to the first target pixel, matching the second output grayscale to the second target pixel, matching the third output grayscale to the third target pixel, and matching the fourth output grayscale to the fourth target pixel when it is diagnosed that all of the converting the input grayscales into the output grayscales in parallel are normally performed,
wherein said matching the output grayscales with the plurality of target pixels further includes:
matching output grayscales of two steps diagnosed as normally performed to the first target pixel and the third target pixel when two steps are diagnosed as abnormally performed and the other two steps are diagnosed as normally performed among the converting the input grayscales into the output grayscales in parallel, and
wherein said matching the output grayscales with the plurality of target pixels further includes:
providing black grayscales to the second target pixel and the fourth target when two steps are diagnosed as abnormally performed and the other two steps are diagnosed as normally performed among the converting the input grayscales into the output grayscales in parallel.

8. The driving method of claim 7, wherein said matching the output grayscales with the plurality of target pixels further includes:
matching output grayscales of three steps diagnosed as normally performed with original target pixels and providing a black grayscale to a target pixel being not matched with the output grayscales when one step is diagnosed as abnormally performed and the other three steps are diagnosed as normally performed among the converting the input grayscales into the output grayscales in parallel.

9. The driving method of claim 8, wherein said matching the output grayscales with the plurality of target pixels further includes:
matching an output grayscale of one step diagnosed as normally performed with an original target pixel and providing black grayscales to target pixels being not matched with the output grayscale when three steps are diagnosed as abnormally performed and the other one step is diagnosed as normally performed among the converting the input grayscales into the output grayscales in parallel.

10. A driving method of a display device comprising:
converting input grayscales for each pixel row into output grayscales based on user setting parameters; and
supplying data voltages corresponding to the output grayscales to each pixel row, wherein the converting the input grayscales for each pixel row into the output grayscales includes:

converting the input grayscales for a plurality of target pixels corresponding to a part of a pixel row into the output grayscales in parallel, the plurality of target pixels being most adjacent to each other; and matching the output grayscales with the plurality of target pixels, wherein said converting the input grayscales into the output grayscales in parallel includes:

converting the input grayscales into the output grayscales based on the user setting parameters in a normal mode, and converting diagnostic input grayscales into diagnostic output grayscales based on diagnostic parameters in a diagnostic mode.

11. The driving method of claim 10, wherein said matching the output grayscales with the plurality of target pixels includes:

diagnosing that the converting the input grayscales into the output grayscales in parallel, in which a diagnostic output grayscale is provided, has been normally performed when the diagnostic output grayscale is equal to an expected value in the diagnostic mode, and diagnosing that the converting the input grayscales into the output grayscales in parallel, in which the diagnostic output grayscale is provided, has been abnormally performed when the diagnostic output grayscale is not equal to the expected value in the diagnostic mode.

12. The driving method of claim 11, wherein the user setting parameters are values that can be changed by a user setting, wherein the input grayscales are values that can be changed according to an input image, and wherein the diagnostic parameters, the diagnostic input grayscales, and the diagnostic output grayscales are preset fixed values.

* * * * *